(12) United States Patent
Jamsek et al.

(10) Patent No.: US 9,086,871 B2
(45) Date of Patent: Jul. 21, 2015

(54) REORDERING THE OUTPUT OF RECIRCULATED TRANSACTIONS WITHIN A PIPELINE

(71) Applicant: International Business Machines Corporation, Armonk, NY (US)

(72) Inventors: Damir A. Jamsek, Austin, TX (US); Andrew K. Martin, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 62 days.

(21) Appl. No.: 14/037,891

(22) Filed: Sep. 26, 2013

(65) Prior Publication Data

US 2015/0089128 A1 Mar. 26, 2015

(51) Int. Cl.
*G06F 9/30* (2006.01)
*G06F 9/38* (2006.01)

(52) U.S. Cl.
CPC ........ *G06F 9/30138* (2013.01); *G06F 9/30101* (2013.01); *G06F 9/3867* (2013.01)

(58) Field of Classification Search
CPC G06F 9/30138; G06F 9/30101; G06F 9/3867
See application file for complete search history.

(56) References Cited

U.S. PATENT DOCUMENTS

| 3,701,111 | A | 10/1972 | Cocke et al. | |
|---|---|---|---|---|
| 5,226,082 | A | 7/1993 | Kustka | |
| 5,325,092 | A | 6/1994 | Allen et al. | |
| 6,741,191 | B2 | 5/2004 | Jang et al. | |
| 7,046,175 | B1 | 5/2006 | Subramaniam | |
| 2002/0154042 | A1* | 10/2002 | Igarashi et al. | 341/67 |
| 2009/0198972 | A1* | 8/2009 | Nystad et al. | 712/220 |
| 2011/0222553 | A1* | 9/2011 | Mital et al. | 370/412 |
| 2012/0173246 | A1 | 7/2012 | Choi et al. | |
| 2012/0254882 | A1* | 10/2012 | Makljenovic et al. | 718/103 |
| 2013/0147644 | A1 | 6/2013 | Agarwal | |
| 2013/0154857 | A1 | 6/2013 | Kushida et al. | |

\* cited by examiner

*Primary Examiner* — Eric Oberly
(74) *Attorney, Agent, or Firm* — Francis Lammes; Stephen J. Walder, Jr.; William J. Stock

(57) ABSTRACT

A mechanism is provided for recirculating transactions within a pipeline while reordering outputs. A set of transactions associated with a block of data is received and each transaction in the set of transactions is processed via the pipeline. For each transaction processed via the pipeline, responsive to the transaction exiting the pipeline, a determination is made as to whether the transaction needs further processing. Responsive to the transaction needing further processing, the transaction is re-circulated via the pipeline forming a recirculated transaction.

14 Claims, 5 Drawing Sheets

US 9,086,871 B2

REORDERING THE OUTPUT OF RECIRCULATED TRANSACTIONS WITHIN A PIPELINE

BACKGROUND

The present application relates generally to an improved data processing apparatus and method and more specifically to mechanisms for reordering the output of recirculated transactions within a pipeline.

A high-bandwidth decompressor must decompress multiple symbols of a transaction in one computational cycle. In order to accomplish such decompression, data processing systems utilize pipelining. However, symbols vary in length. In particular, there is a wide variation between the minimum and maximum number of symbols contained in a transaction. For example, 8 bytes of input could contain as many as 64 or as few as 3 Huffman codes. While the maximum of 64 symbols would be a very unusual and pathological case, building a pipeline deep enough to decode this worst case would be a waste of resources. Moreover, the latency required to process such a transaction through such a deep pipeline would require hundreds of computational cycles.

SUMMARY

In one illustrative embodiment, a method, in a data processing system, is provided for recirculating transactions within a pipeline while reordering outputs. The illustrative embodiment receives a set of transactions associated with a block of data. The illustrative embodiment processes each transaction in the set of transactions via the pipeline. For each transaction processed via the pipeline, the illustrative embodiment determines whether the transaction needs further processing in response to the transaction exiting the pipeline. The illustrative embodiment then re-circulates the transaction via the pipeline forming a recirculated transaction in response to the transaction needing further processing.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide for reordering the output of recirculated transactions within a pipeline. In order to account for a pathologic worst case of a transaction comprising 64 symbols, the illustrative embodiments make use of a much smaller pipeline that maintains throughput without significant performance penalty. The provided pipeline is only long enough to cover the most common case of transaction (for example, 8 stages/8 symbols). If the transaction comprises too many symbols to process fully, the transaction is re-circulated into the pipeline for further processing, which means decoded symbols will exit pipeline out-of-order. The illustrative embodiments reorder the output using an index data structure.

Figure 1:
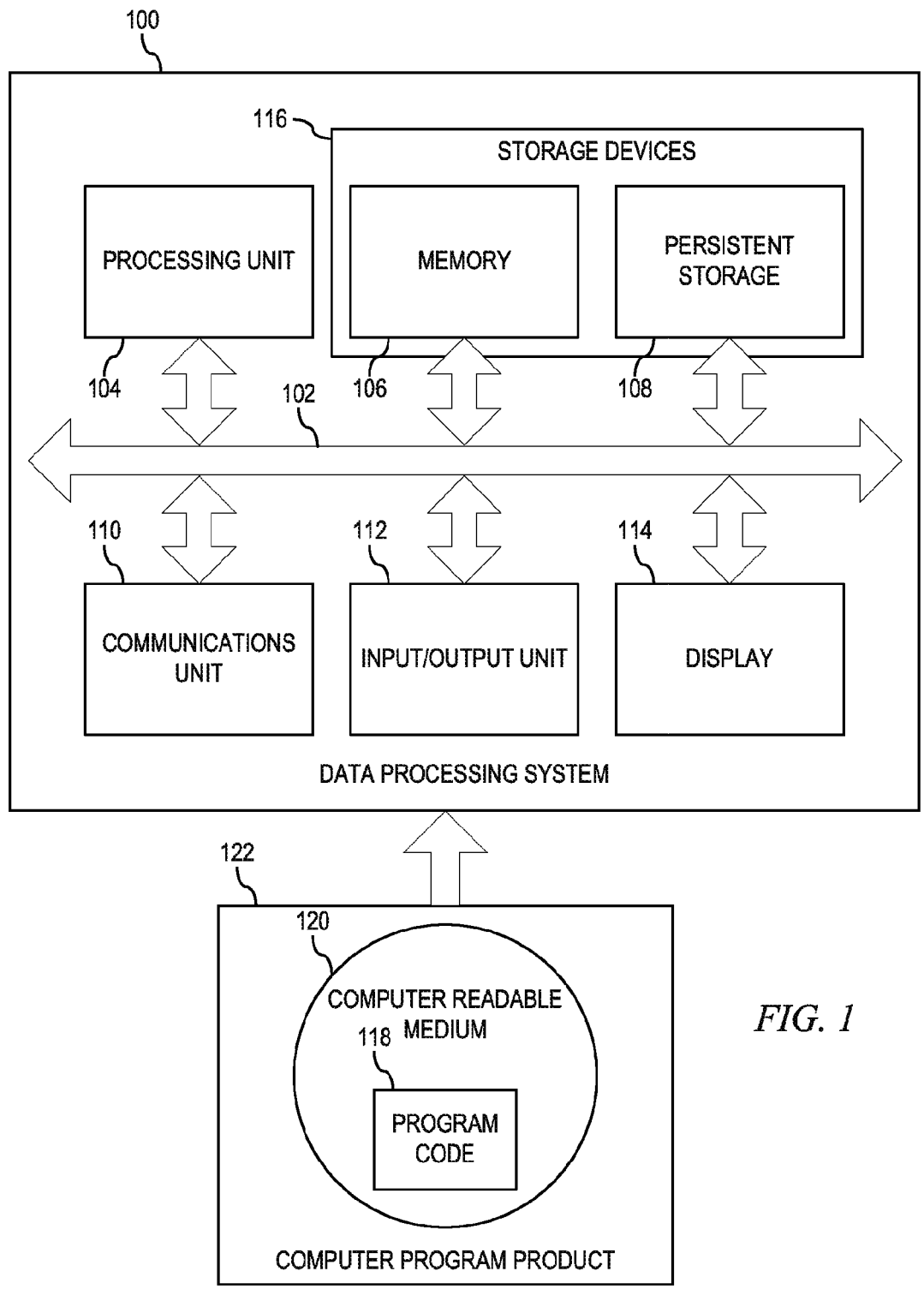
FIG. 1 depicts a block diagram of a data processing system in which illustrative embodiments may be implemented.
Figure 2:
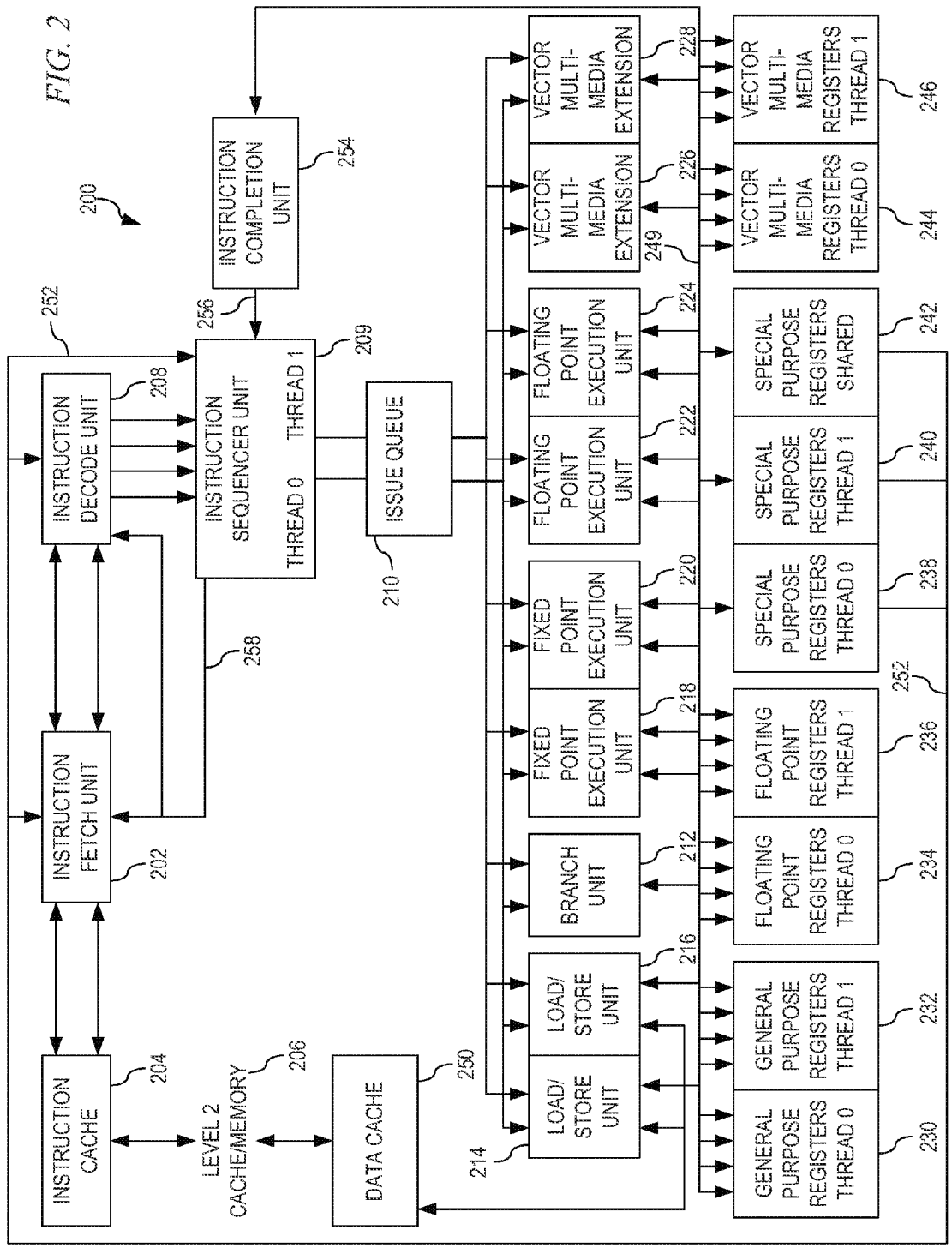
FIG. 2 depicts an exemplary block diagram of a conventional dual threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of using power proxies combined with on-chip actuators to meet a defined power target, this is only an example and is not intended to state or imply any limitation with regard to the features of the present invention. To the contrary, the illustrative embodiments are intended to include distributed data processing environments and embodiments in which power proxies combined with on-chip actuators may be used to meet a defined power target.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form. In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with dual-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data.

Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Figure 3:
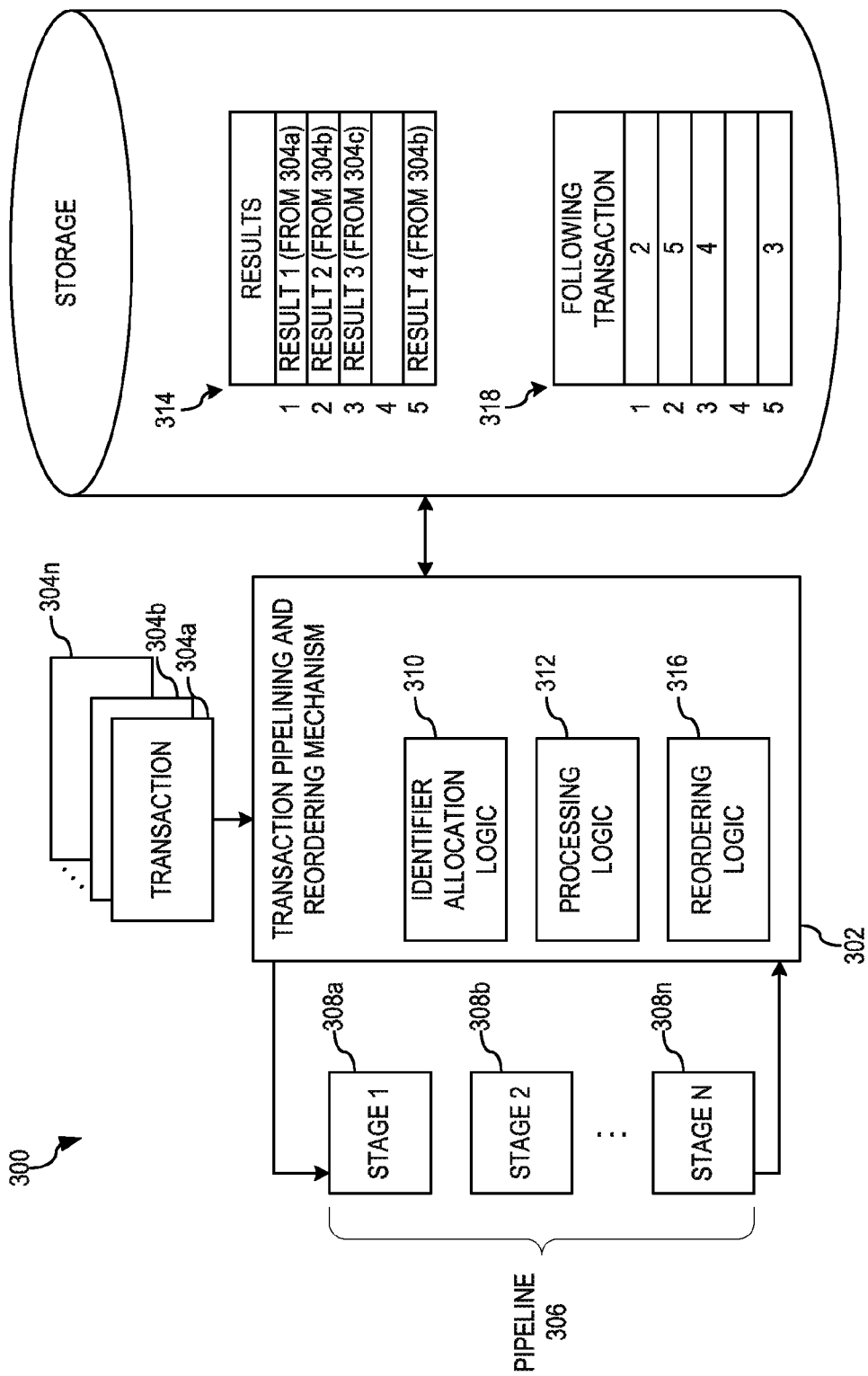
FIG. 3 depicts a transaction pipelining and reordering mechanism in accordance with illustrative embodiment.

FIG. 3 depicts a transaction pipelining and reordering mechanism in accordance with illustrative embodiment. Data processing system 300 comprises transaction pipelining and reordering mechanism (TPRM) 302 that tracks a set of transactions 304a-304n associated with a block of data as the set of transactions 304a-304n are processed through pipeline 306, which comprises one or more stages 308a-308n but is long enough to process a most common case of input for a block of data, such as 8 stages/8 symbols. As each transaction of the set of transactions 304a-304n enters pipeline 306, identifier allocator logic 310 within TPRM 302 identifies and associates a unique identifier for the transaction as well as a unique identifier for the transaction that immediately follows the transaction. For example, as transaction 304a enters pipeline 306, identifier allocator logic 310 identifies unique identifier 1 to be associated with transaction 304a as well as unique identifier 2 to be associated with transaction 304b.

As each transaction of the set of transactions 304a-304n is processed through pipeline 306, processing logic 312 writes the results from processing that transaction to an entry in results data structure 314 given by the unique identifier associated with that transaction. When a transaction exits pipeline 306, reordering logic 316 determines whether the transaction requires further processing. That is, some transactions require additional processing due to the complexity of compressed symbols within the transaction, such as nine or more Huffman codes. If reordering logic 316 determines that the transaction does not require further processing, reordering logic 316 records the unique identifier for the transaction that immediately follows the transaction in an entry in exit data structure 318 given by the unique identifier associated with that transaction.

However, if reordering logic 316 determines that the transaction requires further processing, reordering logic 316 initiates a recirculation process where reordering logic 316 re-circulates the exiting transaction back to the beginning of pipeline 306. During the recirculation process, identifier allocator logic 310 assigns a new unique identifier to the recirculated transaction but retains the following transaction identifier that was originally assigned. When a transaction is recirculated, reordering logic 316 records the new unique identifier for the recirculated transaction in an entry in exit data structure 318 given by the previous unique identifier associated with the transaction. Reordering logic 316 gives preference to re-circulated transactions, such that re-circulated transactions, when present, are processed before any other transaction that has not already entered pipeline 306.

The following clarifies this process by way of an example using only three transactions.

Transaction entering pipeline:
When transaction 304a enters pipeline 306, identifier allocator logic 310 assigns unique identifier 1 as the transaction identifier and unique identifier 2 as the following transaction identifier.
When transaction 304b enters pipeline 306, identifier allocator logic 310 assigns unique identifier 2 as the transaction identifier and unique identifier 3 as the following transaction identifier.
When transaction 304c enters pipeline 306, identifier allocator logic 310 assigns unique identifier 3 as the transaction identifier and unique identifier 4 (assigned but not used) as the following transaction identifier.

Transactions leaving pipeline:
When transaction 304a leaves pipeline 306, processing logic 312 writes the result of the transaction 304a, which is the first result, to entry number 1 of results data structure 314, as given by the unique identifier (1) assigned to transaction 304a. Reordering logic 316 determines that transaction 304a does not require further processing and records unique identifier 2, the following transaction identifier assigned to transaction 304a, in entry number 1 of exit data structure 318, as given by the unique identifier (1) assigned to transaction 304a.
When transaction 304b leaves pipeline 306, processing logic 312 writes the result of the transaction 304b, which is the second result, to entry number 2 of results data structure 314 as given by the unique identifier (2) assigned to transaction 304b. Reordering logic 316 determines that transaction 304b requires further processing. Reordering logic 316 initiates recirculation process where reordering logic 316 re-circulates transaction 304b. Identifier allocator logic 310 assigns unique identifier 5 as the transaction identifier and keeps unique identifier 3 as the following transaction identifier. Reordering logic 316 records the new unique identifier 5 in entry number 2 of exit data structure 318 as given by the previous unique identifier (2) assigned to transaction 304b.
When transaction 304c leaves pipeline 306, processing logic 312 writes the result of the transaction 304c, which is the third result to be computed by the pipeline, but will be the fourth result after reordering, to entry 3 of results data structure 314, as given by its unique identifier (3). Reordering logic 316 determines that transaction 304c does not require further processing. Reordering logic 316 records unique identifier 4, the following transaction identifier assigned to transaction 304c in entry number 3 of exit data structure 318, as given by the unique identifier (3) assigned to transaction 304c.

When transaction 304b leaves pipeline 306 the second time, processing logic 312 writes the result of this second processing of transaction 304b, which is the fourth result to be computed by the pipeline, but will be the third result after reordering, to entry 5 of results data structure 314, as given by its unique identifier (5). Reordering logic 316 determines that transaction 304b does not require further processing. Reordering logic records unique identifier 3 in entry number 5 of exit data structure 318 as given by the unique identifier (5) assigned to transaction 304b for its second pass through the pipeline.

Once each transaction has been fully processed, processing logic 312 may then process the results of the transaction as is indicated by the original request, such as stream the results to memory, send the results to another pipeline for further processing, or the like. In order to process the results in the proper order, processing logic 312 utilizes exit data structure 318, such that for each result identified by a unique identifier, the entry in data structure 318 at that entry number identifies the next transaction for which to process the results. In accordance with the example above, processing logic 312 would:

write the result from entry 1 from results data structure 314 which was the first result.

per the contents of entry number 1 in exit data structure 318 jump to entry number 2;

write the result for entry number 2 from results data structure 314 which was the second result and, as per the contents of entry 2 in exit data structure 318, jump to entry number 5;

write the result for entry number 5 from results data structure 314 which was the fourth result and, as per the contents of entry 5 in exit data structure 318, jump to entry number 3; and write the results for entry number 3 from results data structure 314 which was the third result, and, as per the contents of entry 3 in exit data structure 318, jump to entry number 4, where there are no results.

Once the results of the transaction are written, reordering logic 316 releases the unique identifiers for reuse by identifier allocator logic 310.

Thus, in the illustrative embodiments, TPRM 302 may be processing more than one transaction in pipeline 306 simultaneously. Further, identifier logic 310, processing logic 312, and reordering logic 316 each operate independently of each other. That is, in the illustrative embodiments, there are three processes being performed concurrently: process A, being performed by identifier logic 310, feeds transactions into the pipeline and allocates unique ids; process B, being performed by processing logic 312, pulls transactions out of the pipeline, writes results to results data structure 314, determines whether a transaction needs further processing, and writes to exit data structure 318; and process C, performed by reordering logic 316, reads exit data structure 318 and results data structure 314 and sends the results in proper order to the proper output.

Further, reordering logic 316 does not have to wait until all the transactions have exited pipeline 306 before outputting results from results data structure 314. That is, reordering logic 316 may output results from results data structure 314 as soon as a result has been written into results data structure 314. Moreover, if a transaction requires further processing and is recirculated, as soon as the identifier of the results which follow the recirculated transaction are written to exit data structure 318, reordering logic 316 can begin waiting for the results of the recirculated transaction to be written to the results data structure 314 and, as soon as the results have been written to results data structure 314, reordering logic 316 may output those results as well.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
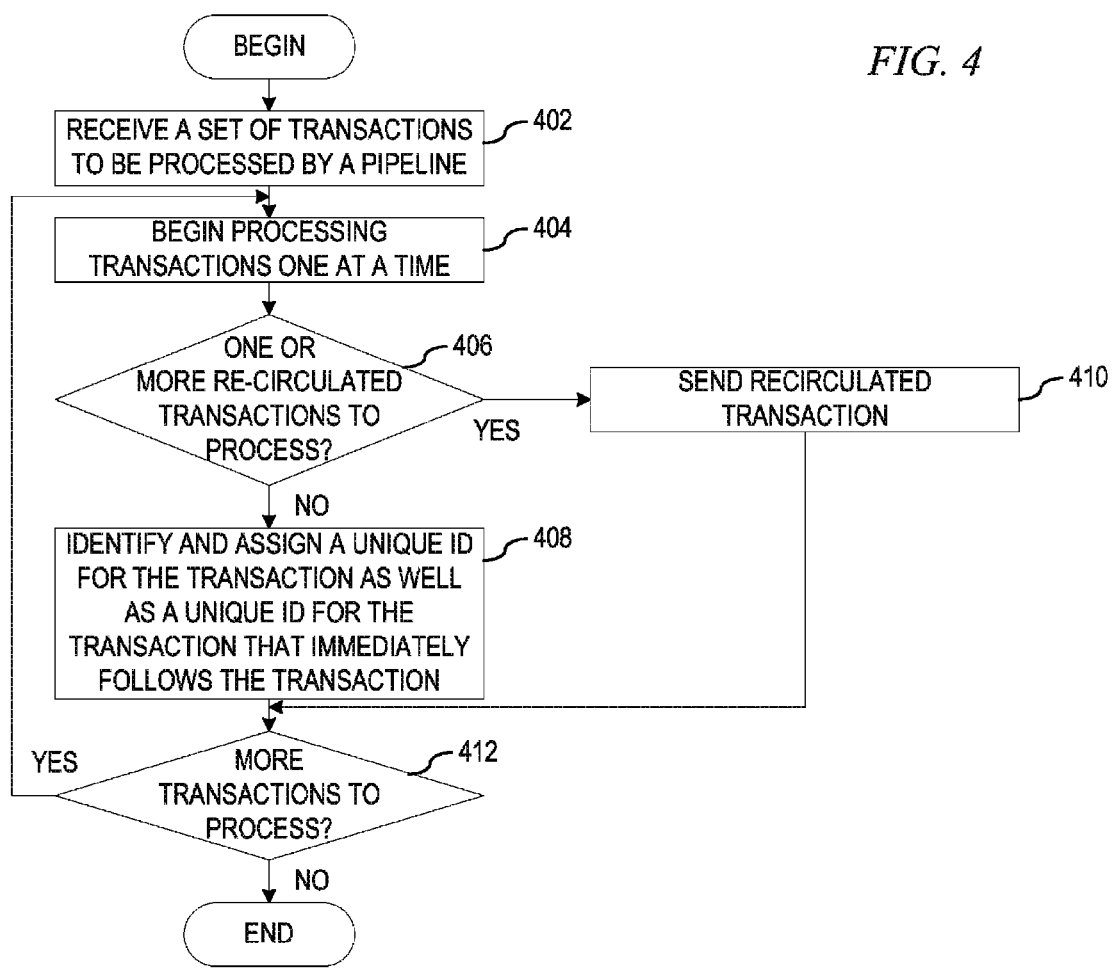
FIG. 4 depicts an exemplary flowchart of the operation performed by identifier logic of a transaction pipelining and reordering mechanism (TPRM) in accordance with illustrative embodiment.

FIG. 4 depicts an exemplary flowchart of the operation performed by identifier logic of a transaction pipelining and reordering mechanism (TPRM) in accordance with illustrative embodiment. As the operation begins, the TPRM receives a set of transactions to be processed by a pipeline (step 402). The TPRM then begins processing the transaction so as to send them through the pipeline one at a time (step 404). Prior to each transaction being processed through the pipeline, the TPRM determines whether there is a re-circulated transaction that needs to be processed (step 406). If at step 406 the TPRM determines there is not a re-circulated transaction that needs to be processed, for the immediately pending transaction, the TPRM identifies and assigns a unique identifier for the transaction as well as a unique identifier for the transaction that immediately follows the transaction from an index data structure (step 408). If at step 406 the TPRM determines that there is a re-circulated transaction that needs to be processed, then TPRM sends the recirculated transaction into the pipeline (step 410). From steps 408 or 410, the TPRM then determines whether there are more transactions, either new or recirculated, to process (step 412). If at step 412 the TPRM then determines there are more transactions to process, the operation returns to step 404. If at step 412 the TPRM then determines there are no more transactions to process, the operation ends.

Figure 5:
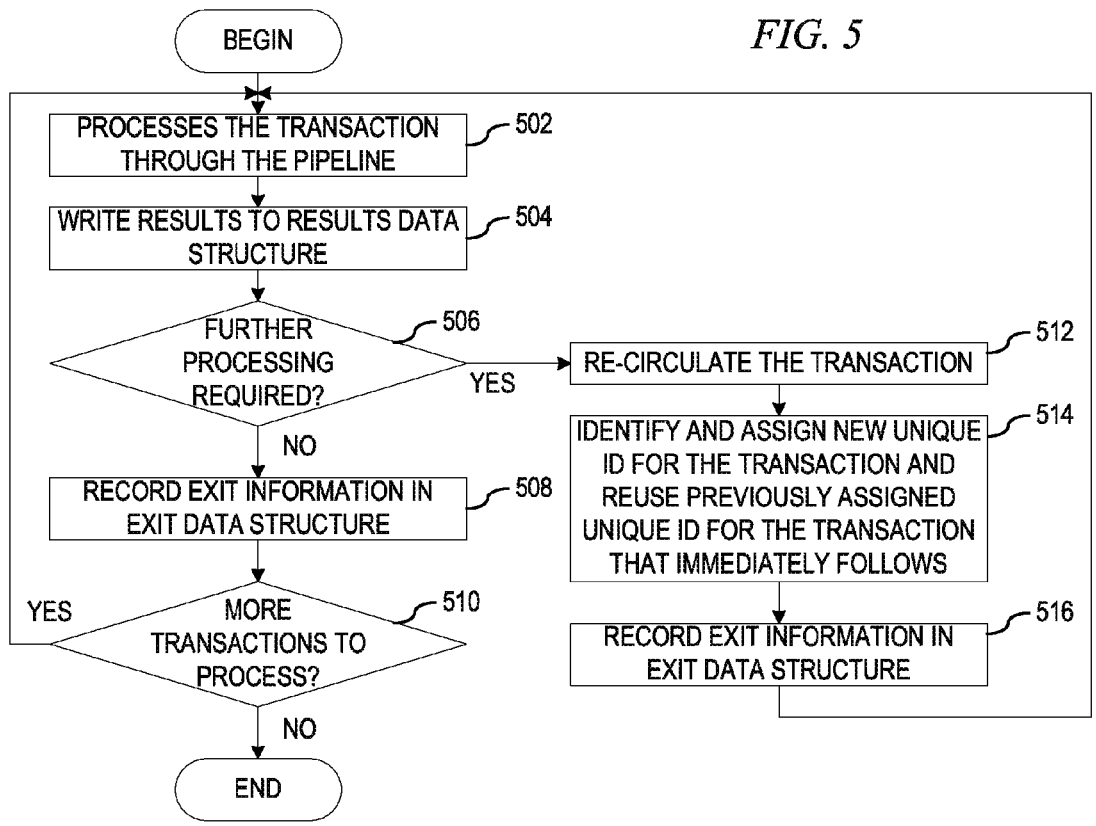
FIG. 5 depicts an exemplary flowchart of the operation performed by processing logic of a transaction pipelining and reordering mechanism (TPRM) in accordance with illustrative embodiment.

FIG. 5 depicts an exemplary flowchart of the operation performed by processing logic of a transaction pipelining and reordering mechanism (TPRM) in accordance with illustrative embodiment. As the operation begins, the TPRM processes one or more transactions though a pipeline (step 502). As each transaction exits the pipeline, the TPRM writes the results of processing the transaction to the results data structure (step 504). The TPRM then determines whether the transaction requires further processing (step 506). If at step 506 the TPRM determines that the transaction does not require further processing, the TPRM records the unique identifier for the transaction that immediately follows the transaction in an exit data structure at a location given by the unique identifier for the exiting transaction (step 508). The TPRM then determines whether there are more transactions to process (step 510). If at step 510 the TPRM then determines there are more transactions to process, the process returns to step 502.

If at step 506 the TPRM determines that the transaction requires further processing, the TPRM initiates a recirculation process to re-circulate the transaction back to the beginning of the pipeline (step 512). The TPRM identifies a new unique identifier for the transaction but keeps the already assigned unique identifier for the transaction that immediately follows the transaction (step 514). The TPRM then records the new unique identifier in an exit data structure (step 516) at a location given by the previous unique identifier associated with the transaction and the operation returns to step 502. If at step 510 TPRM then determines there are no more transactions to process, the operation ends.

Figure 6:
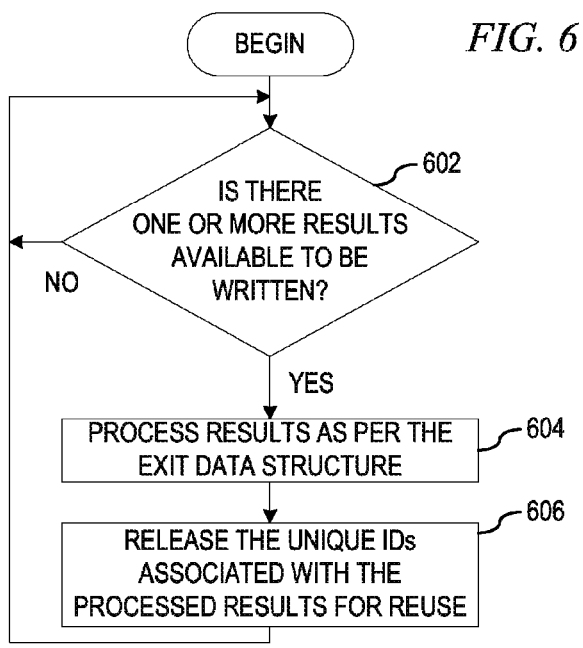
FIG. 6 depicts an exemplary flowchart of the operation performed by reordering logic of a transaction pipelining and reordering mechanism (TPRM) in accordance with illustrative embodiment.

FIG. 6 depicts an exemplary flowchart of the operation performed by reordering logic of a transaction pipelining and reordering mechanism (TPRM) in accordance with illustrative embodiment. As the operation begins, the TPRM determines whether there are one or more results in a results data structure that are available to be written (step 602), i.e. have the results associated with a transaction been fully processed. If at step 602 there fails to be results in the results data structure that are available to be written, the operation returns to step 602. If at step 602 there are results in the results data structure that are available to be written, the TPRM processes the results of the transactions as per the exit data structure (step 604). The TPRM then releases the unique identifiers associated with the processed results for reuse (step 606), with the operation returning to step 602 thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for reordering the output of re-circulated transactions within a pipeline. The illustrative embodiments account for a pathologic worst case of a transaction comprising 64 symbols, by using a smaller pipeline that maintains throughput without significant performance penalty. The provided pipeline is only long enough to cover the most common case of transaction (for example, 8 stages/8 symbols). If the transaction comprises too many symbols to process fully, the transaction is re-circulated into the pipeline for further processing, which means decoded symbols will exit pipeline out-of-order. The illustrative embodiments reorder the output using an index data structure.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for recirculating transactions within a pipeline while reordering outputs, the method comprising:
   receiving a set of transactions associated with a block of data;
   processing each transaction in the set of transactions via the pipeline;
   for each transaction processed via the pipeline:
      as the transaction enters the pipeline, identifying a unique identifier for the transaction and a unique identifier for a subsequent transaction that will follow the transaction;
      responsive to the transaction exiting the pipeline:
         storing results of the transaction in a results data structure according to the unique identifier;
         determining whether the transaction needs further processing;
         responsive to the transaction failing to need further processing, recording the unique identifier for the transaction that immediately follows the transaction in an exit data structure for use in exporting the results; and
         responsive to the transaction needing further processing, recirculating the transaction via the pipeline forming a recirculated transaction; and
   for each recirculated transaction processed via the pipeline:
      identifying a new unique identifier for the recirculated transaction while retaining, the unique identifier for the subsequent transaction that will follow the recirculated transaction;
      recording the new unique identifier for the transaction in the exit data structure for use in exporting the results; and
      processing the recirculated transaction.

2. The method of claim 1, further comprising:
   responsive to one or more results being available to be written from the results data structure, exporting the one or more results of the set of transactions as per the exit data structure.

3. The method of claim 1, further comprising:
   responsive to the recirculated transaction exiting the pipeline and failing to need further processing, storing the results of the recirculated transaction in the results data structure according to the new unique identifier.

4. The method of claim 1, wherein, responsive to the transaction being re-circulated through the pipeline, the reprocessed transaction enters the pipeline before any unprocessed transaction.

5. The method of claim 1, wherein the block of data comprises compressed symbols.

6. The method of claim 1, wherein each transaction comprises nine or more Huffman codes.

7. The method of claim 1, wherein the exit data structure is a linked list.

8. The method of claim 1, wherein the results data structure is in a static random-access memory (SRAM).

9. A computer program product comprising a non-transitory computer readable storage medium having a computer readable program stored therein, wherein the computer readable program, when executed on a computing device, causes the computing device to:
   receive a set of transactions associated with a block of data;
   process each transaction in the set of transactions via a pipeline;

for each transaction processed via the pipeline:
as the transaction enters the pipeline, identify a unique identifier for the transaction and a unique identifier for a subsequent transaction that will follow the transaction;
responsive to the transaction exiting the pipeline:
store the results of the transaction in a results data structure according to the unique identifier;
determine whether the transaction needs further processing;
responsive to the transaction failing to need further processing, record the unique identifier for the transaction that immediately follows the transaction in an exit data structure for use in exporting the results; and
responsive to the transaction needing further processing, re-circulate the transaction via the pipeline forming a recirculated transaction; and
for each recirculated transaction processed via the pipeline:
identify a new unique identifier for the recirculated transaction while retaining the unique identifier for the subsequent transaction that will follow the recirculated transaction;
record the new unique identifier for the transaction in the exit data structure for use in exporting the results; and
process the recirculated transaction.

10. The computer program product of claim 9, wherein the computer readable program further causes the computing device to:
responsive to one or more results being available to be written from the results data structure, export the one or more results of the set of transactions as per the exit data structure.

11. The computer program product of claim 9, wherein the computer readable program further causes the computing device to:
responsive to the recirculated transaction exiting the pipeline and failing to need further processing, store the results of the recirculated transaction in the results data structure according to the new unique identifier; and
responsive to one or more results being available to be written from the results data structure, export the results of the set of transactions as per the exit data structure.

12. An apparatus comprising:
a processor; and
a memory coupled to the processor, wherein the memory comprises instructions which, when executed by the processor, cause the processor to:
receive a set of transactions associated with a block of data;
process each transaction in the set of transactions via a pipeline;
for each transaction processed via the pipeline:
as the transaction enters the pipeline, identify a unique identifier for the transaction and a unique identifier for a subsequent transaction that will follow the transaction;
responsive to the transaction exiting the pipeline:
store the results of the transaction in a results data structure according to the unique identifier;
determine whether the transaction needs further processing;
responsive to the transaction failing to need further processing, record the unique identifier for the transaction that immediately follows the transaction in an exit data structure for use in exporting the results; and
responsive to the transaction needing further processing, re-circulate the transaction via the pipeline forming a recirculated transaction; and
for each recirculated transaction processed via the pipeline:
identify a new unique identifier for the recirculated transaction while retaining the unique identifier for the subsequent transaction that will follow the recirculated transaction;
record the new unique identifier for the transaction in the exit data structure for use in exporting the results; and
process the recirculated transaction.

13. The apparatus of claim 12, wherein the instructions further cause the processor to:
responsive to one or more results being available to be written from the results data structure, export the one or more results of the set of transactions as per the exit data structure.

14. The apparatus of claim 12, wherein the instructions further cause the processor to:
responsive to the recirculated transaction exiting the pipeline and failing to need further processing, store the results of the recirculated transaction in the results data structure according to the new unique identifier; and
responsive to one or more results being available to be written from the results data structure, export the results of the set of transactions as per the exit data structure.

* * * * *